UNITED STATES PATENT OFFICE.

JOHN H. SMITH, OF NEW YORK, N. Y.

IMPROVEMENT IN TREATING PEAT.

Specification forming part of Letters Patent No. 51,231, dated November 28, 1865.

*To all whom it may concern:*

Be it known that I, JOHN H. SMITH, of the city, county, and State of New York, have invented a new and useful Improvement in Treating Peat; and I do hereby declare that the following is a full, clear, and exact description thereof, which will enable others skilled in the art to fully understand and make use of the same.

The object of this invention is to separate from peat all sulphur, or salts containing sulphur and other impurities, and to render peat fit for the manufacture of illuminating-gas.

The invention consists in treating peat with superheated steam until all salts and sulphur will be disengaged and freed from the carbonaceous matter, and a substance is obtained which can be used advantageously in the manufacture of gas.

In carrying out my invention I place the crude peat into vats of metal, or any other suitable material, and apply superheated steam through the mass, the mass being constantly agitated by suitable stirrers while the steam passes through, so as to bring said steam in intimate contact with every particle of peat.

By the action of the superheated steam all sulphur and salt containing sulphur and other impurities injurious in the manufacture of gas are disengaged from the carbonaceous matter forming the main portion thereof, and by subjecting the mass to pressure in a hydraulic or other suitable press all said impurities are separated from the peat, and a mass is obtained which can be used with great advantage in the manufacture of illuminating-gas.

I claim as new and desire to secure by Letters Patent—

Treating peat with superheated steam, substantially as and for the purpose described.

JOHN H. SMITH.

Witnesses:
M. M. LIVINGSTON,
W. HAUFF.